United States Patent [19]

Hilbig et al.

[11] Patent Number: 5,708,162
[45] Date of Patent: Jan. 13, 1998

[54] PROCESS FOR THE PREPARATION OF LOW MOLECULAR WEIGHT POLYSACCHARIDE ETHERS

[75] Inventors: Josef Hilbig, Taunusstein; Reinhard Doenges, Bad Soden, both of Germany

[73] Assignee: Hoechst Aktiengesellschaft, Germany

[21] Appl. No.: 416,185

[22] Filed: Apr. 4, 1995

[30] Foreign Application Priority Data

Apr. 5, 1994 [DE] Germany ............... 44 11 681.0

[51] Int. Cl.$^6$ ............... C07G 17/00; C07H 1/00; C07H 1/06

[52] U.S. Cl. ............... 536/124; 536/123.1; 536/102; 536/127; 536/128; 536/111; 536/56; 536/84; 536/30; 536/43; 536/45; 536/50; 536/1.11

[58] Field of Search ............... 536/124, 56, 120, 536/111, 123.1, 128, 127, 84, 102, 30, 43, 45, 50, 1.11

[56] References Cited

U.S. PATENT DOCUMENTS

| | | | |
|---|---|---|---|
| 2,749,336 | 6/1956 | Boddicker et al. | 536/124 |
| 3,394,127 | 7/1968 | Sommers | 536/124 |
| 3,664,961 | 5/1972 | Norris | 536/124 |
| 3,808,195 | 4/1974 | Shelso et al. | 536/124 |
| 4,048,433 | 9/1977 | Burns et al. | 536/128 |
| 4,100,094 | 7/1978 | Burns et al. | 536/128 |
| 4,244,778 | 1/1981 | Lindahl et al. | 536/124 |
| 4,289,642 | 9/1981 | Weber et al. | 536/124 |
| 4,368,324 | 1/1983 | Bayerlein et al. | 536/124 |
| 4,510,306 | 4/1985 | Langdon | 536/124 |
| 4,552,674 | 11/1985 | Brown et al. | 536/124 |
| 4,814,039 | 3/1989 | Willging | 536/128 |
| 5,182,054 | 1/1993 | Bauer et al. | 536/124 |

FOREIGN PATENT DOCUMENTS

| | | |
|---|---|---|
| 0 465 992 | 1/1992 | European Pat. Off. |
| 1448567 | 6/1966 | France . |
| 2 179 961 | 11/1973 | France . |
| 1543116 | 7/1969 | Germany . |
| 3016561 | 11/1981 | Germany . |
| 61 040 303 | 2/1986 | Japan . |
| 1139637 | 1/1969 | United Kingdom . |

OTHER PUBLICATIONS

Slama, O., et al, *Am. Chem. Soc.* 97(6):40505c Abstract (1981) [121–141], month not available.

Krässig, H. A., *Cellulose: Structure, accessibility and reactivity*, Gordon and Breach Science Publishers, 1993, pp. 44–49, month not available.

*Primary Examiner*—Louise Leary
*Attorney, Agent, or Firm*—Connolly & Hutz

[57] ABSTRACT

Process for the preparation of low molecular weight polysaccharide ethers which can be employed in binders for improving adhesive power and film-forming properties, by oxidative degradation of relatively high molecular weight polysaccharide ethers, which comprises initially introducing a relatively high molecular weight polysaccharide ether in suspension (e.g. in a slurry), adding a perborate or a mixture of perborate and perborate activator, and carrying out the oxidative degradation at a temperature of between 25° and 90° C.

24 Claims, No Drawings

PROCESS FOR THE PREPARATION OF LOW MOLECULAR WEIGHT POLYSACCHARIDE ETHERS

FIELD OF THE INVENTION

This invention relates to a process for adjusting the molecular weight of a polysaccharide ether. An aspect of this invention relates to a downward adjustment (degradation or depolymerization) of the molecular weight of a relatively high molecular weight polysaccharide ether. Still another aspect of this invention relates to controlled oxidative degradation or depolymerization of a polysaccharide ether.

DESCRIPTION OF THE PRIOR ART

The term "polysaccharide" is a collective term for macromolecular carbohydrates whose molecule consists of a large number of monosaccharide molecules which are joined to one another by glycosidic linkage. Polysaccharides are classified by dividing them into homopolysaccharides and heteropolysaccharides. Whereas the homopolysaccharides contain only one kind of unit, the heteropolysaccharides consist of monomer units of different kinds. The homopolysaccharides include starch and glycogen, which are important as reserve carbohydrates, and the structural polymer cellulose, which may be considered to be a polycondensation product of D-glucose, and also chitin and alginic acid and alginates. The heteropolysaccharides include, inter alia, pectins, mannans, galactans, galactomannans, such as guar gum, agar, and wood polyoses.

Not only the polysaccharides but also, in particular, the corresponding polysaccharide ethers find application as thickeners, emulsion stabilizers and binders in, for example, medicine, pharmacy, the cosmetics, paper, textile and printing industries, and are employed as auxiliaries in the production of polymers or for preparing so-called drilling fluids in the well-hole technology of petroleum and natural gas extraction. A "polysaccharide ether" is a polysaccharide in which one or more of the free OH groups of the polysaccharide molecule has been converted to an OR group, where R is organic, e.g. an aliphatic group (which can itself be substituted, e.g. with OH, COOH, a sulfo group, or the like).

The technological properties of the polysaccharide ethers depend heavily on their molecular mass and the viscosity of their solutions. The molecular mass of the polymers is a function of the degree of polymerization and of the molecular mass of the basic monomer unit (=basic molecular mass). Whereas high molecular weight polysaccharide ethers are employed in applications which require highly viscous, highly thickened solutions, the low molecular weight polysaccharide ethers are used in the form of solutions of relatively high concentration, but still not too viscous, in applications where adhesive power and film-forming properties are of importance.

Low molecular weight polysaccharide ethers, which are of low viscosity in comparison with polysaccharide ethers of medium and high molecular weight, can in principle be prepared by two different routes. One route starts from a low molecular weight polysaccharide, which is treated with alkali and then etherified, while the other involves the depolymerization of an already relatively high molecular weight polysaccharide ether until the desired molecular mass is attained.

It has been found that the low molecular mass of a polysaccharide ether can only be adjusted to a certain extent by choosing an appropriately low molecular weight starting polysaccharide for the preparation of the ether. This means that it is necessary in practice, after the preparation of the polysaccharide ether, to adjust the degree of polymerization (DP), and therefore the molecular mass, to the low value desired by means of controlled depolymerizing measures. Oxidative chemical methods are generally employed for this purpose.

In the prior art preparation of the polysaccharide ethers, aqueous hydrogen peroxide solution is generally used to reduce the molecular mass of the polysaccharide ether (i.e. to provide controlled oxidative degradation). The polysaccharide ether is maintained at elevated temperature for some time following the addition of the hydrogen peroxide solution. The quantity of hydrogen peroxide, the temperature and the duration of the treatment are selected depending on the desired solution viscosity of the end product. The treatment is advantageously carried out at an alkaline pH.

In some processes, the polysaccharide ether in dry or water-moist form is treated with aqueous hydrogen peroxide solution. DE-A-1 543 116 describes such a process. Dry or still water-moist cellulose ethers are kneaded with aqueous hydrogen peroxide solution to form a paste, the pH is adjusted to between 9 and 11, kneading is continued for some time at a temperature in the range from 100° to 250° C. and the paste is then dried. The disadvantages of this process are that the cellulose ethers discolor, and thus require rebleaching; part of the hydrogen peroxide remains unused, so that in the course of time the products undergo further depolymerization and see a reduction in their solution viscosities; and also that, because of the oxidative formation of carboxyl groups, an acidic pH may develop, possibly making it necessary to add neutralizing substances.

The polysaccharide ethers may also be treated after having been wetted with an organic, usually water-miscible, solvent or having been stirred therein to form a suspension. In this case the wetting or suspension medium is employed in a ratio of from 1:1 to 50:1 based on the dry polysaccharide ether. Thus French Patent No. 1 448 567 (Jun. 27, 1965) describes a process for the depolymerization of carboxymethylcellulose (CMC) in which the freshly prepared carboxymethylcellulose ether, suspended in about 10 times the quantity of a mixture of ethanol and benzene and in the presence of around 0.3 mol of sodium hydroxide (based on the cellulose employed initially), is treated with a 35% strength by weight solution of hydrogen peroxide.

A disadvantage of using hydrogen peroxide in any of these prior art processes is that, when it is used, a considerable proportion decomposes into oxygen and water and is therefore inactive. Moreover, in processes which use organic solvents such as ethanol, benzene, isopropyl alcohol and the like, the nascent oxygen can form explosive mixtures with the solvent vapors unless it is able to escape from the reactor.

To illustrate this point, a table (Table 1) is included with the working Examples of this specification. Table 1 shows examples of the composition of the vapor space atmosphere for the oxidative degradation of carboxymethylcellulose using hydrogen peroxide solution in accordance with the prior art. It will be noted that the oxygen content of the vapor space atmosphere is large enough to impart explosive properties to this atmosphere.

U.S. Pat. No. 2,749,336 (Jun. 3, 1956) discloses a process for the preparation of cellulose ethers of low molecular mass by using oxidizing agents such as the hypo acids of halogens, or peroxides or periodates. In the process described in this reference treatment with the oxidizing agent is applied at the alkali metal cellulose stage. The alkali metal cellulose pretreated in this way is then added to a suspension medium, for example isopropanol, and is etherified by addition of the desired etherifying agent, for example monochloroacetic acid.

The Czech authors O. Slama and Z. Prikyl describe the reduction of the viscosity of carboxymethylcellulose and potato starch solution using sodium dithionite and hydrogen peroxide (Vyzk. Ustav. Geol. Inz. 37 (1981) 121 to 141). Their kinetic investigations relate to fluids for so-called fracturing in petroleum and gas extraction. The same application is described in U.S. Pat. No. 4,552,674 (Nov. 12, 1985) for alkali metal salts of peroxomono- and -disulfuric acid.

DE-A-3 016 561 (Nov. 5, 1981) mentions the degradation of ether derivatives of the endosperm from the seeds of *Cassia occidentalis* using inorganic peroxides or hydrogen peroxide, but gives no example of an inorganic peroxide.

A feature common to the abovementioned disclosures is that the peroxides which are used in addition to aqueous hydrogen peroxide are employed exclusively in the form of solutions. The use of aqueous peroxide solutions has the general disadvantage that the water introduced is absorbed by the polysaccharide ether which has undergone oxidative degradation, which greatly hinders or even totally prevents its processing because of an increased tendency toward sticking, agglomeration, agglutination and the formation of "burned" particles on drying.

Accordingly, an objective of the present invention is to provide a process for the preparation of a low molecular weight polysaccharide ether, i.e. a polysaccharide ether having a low polymer molecular mass, in which the formation of an explosive vapor atmosphere and the incorporation of additional water into the polysaccharide ether is significantly lessened or even avoided altogether.

SUMMARY OF THE INVENTION

The present invention relates to a process for the preparation of low molecular weight polysaccharide ethers by controlled oxidative degradation of relatively high molecular weight polysaccharide ethers in suspension (e.g. in a slurry), which comprises initially introducing the relatively high molecular weight polysaccharide ether in suspension (e.g. in a slurry), adding a perborate as the oxidizing agent (optionally in combination with a perborate activator), and carrying out the oxidative degradation at a temperature of between 25° and 90° C., preferably between 50° and 80° C.

The preferred starting materials are relatively high molecular weight polysaccharide ethers which, depending on the degree of etherification, have an average molecular mass $M\eta$ of from 10,000 to 350,000 g/mol. This molecular mass range corresponds to a solution viscosity in the range from 3 to more than 100,000 mPa.s (measured in a 1.9% strength by weight aqueous solution at 20° C. using a Höppler falling-ball viscometer). The molecular mass of the polymers is determined by measuring solutions of the polysaccharide ethers using an Ubbelohde capillary viscometer and then calculating the molecular mass in accordance with the equation of Staudinger (see e.g. Hans A. Krässig, "Cellulose: Structure, accessibility and reactivity", Gordon & Breach Science Publishers, Yverdon, Switzerland, 1993, p. 44 ff.).

The terms "polysaccharide" and "polysaccharide ether", as used in connection with the description of this invention, have the meanings set forth previously. Particularly preferred polysaccharides from which preferred polysaccharide ethers are derived include cellulose, starch and the galactomannans.

Preferred cellulose ethers especially well-suited for use this invention include both ionic (or ionizable) and nonionic cellulose ethers, e.g. those cellulose ethers in which the R radical of the —OR groups on the cellulose molecule are aliphatic (including substituted aliphatic), e.g. lower alkyl; hydroxy-, carboxy- and/or sulfo-substituted alkyl (including salts of the alkyl groups substituted with one or more acid groups), alkoxy-substituted alkyl, and the like.

Typical examples of such cellulose ethers include carboxyalkylcellulose ethers, for example carboxymethylcellulose (CMC) and hydroxyalkylcellulose ethers, for example hydroxyethylcellulose (HEC), and the mixed ethers which are derived from these, for example carboxymethylhydroxyethylcellulose (CMHEC) or alkylhydroxyalkylcellulose ethers, for example methylhydroxypropylcellulose (MHPC) or methylhydroxyethylcellulose (MHEC) or alkyloxyhydroxyalkylhydroxyalkylcelluloses, for example alkyloxyhydroxypropylhydroxyalkylcellulose ethers, or ternary ethers such as methylhydroxyethylcarboxymethylcellulose (MHECMC), and also sulfoalkylcellulose ethers, for example sulfoethylcellulose (SEC) and mixed ethers thereof, such as carboxyalkylsulfoalkylcellulose, for example carboxymethylsulfoethylcellulose (CMSEC) or the ternary ether methylhydroxyethylsulfoethylcellulose (MHESEC) or hydroxyalkylsulfoalkylcellulose ethers, for example hydroxyethylsulfoethylcellulose (HESEC). The lower alkyl groups present in the abovementioned cellulose ethers are preferably $C_1$-$C_4$-alkyl groups, especially methyl and/or ethyl.

In the case of the starch ethers, the —OR groups are similar to those mentioned above. For example, one starch ether particularly well suited for use in accordance with the invention is hydroxypropylstarch (HPS). Carboxymethylstarch (CMS) or hydroxyethylstarch (HES) are further examples and hence can also be depolymerized in accordance with the invention.

The process of this invention is also suitable for the depolymerization of galactomannan ethers, such as carboxymethylhydroxypropylguar gum.

The oxidative degradation of the relatively high molecular weight polysaccharide ethers is carried out by addition of a perborate, preferably a solid, inorganic perborate salt. The term "perborate" refers to a borate in which the dioxygen group —O—O— is present in the borate anion. The preferred cationic counterion is inorganic and hence is preferably derived from a metal, most preferably an alkali or alkaline earth metal. Thus, the most preferred cations are alkali metal cations such as $Na^+$, but alkaline earth metal perborates such as calcium perborate or magnesium perborate are also suitable for use in this invention. Sodium perborate is preferably employed in the form of either its tetrahydrate or its monohydrate.

The preferred inorganic perborate oxidizing agents can be employed in any suitable form, typically in the form of a dilute aqueous solution, as a suspension (e.g. small crystals distributed substantially uniformly throughout a suspension medium) or as a crystalline solid, essentially free of any solution or suspension medium. The concentration of the aqueous solution in general ranges from an oxidatively effective amount up to 2.5% by weight, based on the perborate.

The aqueous solution form of perborate is preferred when the relatively high molecular weight polysaccharide ether is to be treated with only a small amount of the perborate.

Suitable suspension media for the solid perborates are liquids which are largely inert, i.e. those which are not themselves attacked oxidatively by perborate and which also have no adverse effect on the oxidative degradation of the polysaccharide ethers. Examples of such suspension media are water, water-miscible organic solvents such as $C_1$–$C_6$ alcohols, ketones or ethers and mixtures (preferably aqueous mixtures) of the abovementioned suspension media. The crystal suspension is advantageously not made up until shortly before it is used. The ratio of suspension medium to perborate is normally from 2:1 to 15:1. The suspension media used are advantageously those which have been employed for the preparation of the polysaccharide ethers in suspension. The polysaccharide ether suspension can be relative thin and watery, if desired, as in the case of a slurry. Suitable polysaccharide ether suspension media include $C_1$–$C_6$ alcohols such as ethanol, isopropanol or tert-butanol, ethers, for example dimethylglycol, or ketones such as acetone, and also mixtures of these suspension media, including mixtures with major or minor amounts of water. Water can also be the predominant or sole component of the suspension medium.

In a further embodiment of the process according to the invention the perborate is employed as a solid, i.e. without first distributing it uniformly through a suspension or solution medium. It has been found that, with this form of addition, it is possible to avoid the additional introduction of the abovementioned suspension media, especially water.

The perborates used in accordance with the invention can be employed alone or in combination with other ingredients, both active and inactive. A preferred additional ingredient is taken from a class of compounds known as perborate activators. Perborate activators are conventionally used in the detergent industry. The preferred type of perborate activator is referred to below as an acyl perborate activator and can include, for example, compounds (including cyclic compounds) which can be considered to be derivatives wherein one or more —NH— or OH— groups has been converted to R'(CO)O— or R'CONH— or the like (where R' is aliphatic or aromatic). Preferred perborate activators include acylated lower alkylene diamines such as tetraacetylethylenediamine (TAED) and tetraacetylmethylenediamine, acylated urea derivatives such as tetraacetylglycouril (TAGU), acylated triazines such as diacetyldioxohexahydrotriazine (DADHT), acylated carbohydrates such as pentaacetylglucose (PAG), and acylated compounds having at least one phenolic OH, e.g. sodium acetoxybenzenesulfonate, sodium nonanoyloxybenzenesulfonate (NOBS) or sodium benzoyloxybenzenesulfonate (BOBS).

The use of a combination of a perborate and a perborate activator is a particular advantage when the oxidative degradation is carried out at low to moderate temperatures in the range from 25° to 60° C. Both a perborate and a perborate activator can be added in the form of solids, and the perborate and perborate activator solids can be pre-mixed prior to addition.

The process according to the invention can be carried out either batchwise or continuously. The polysaccharide ether, which is already in the form of a suspension (e.g. an aqueous slurry) owing to its prior treatment with alkali or its prior etherification, or has been prepared separately by wetting it to form a slurry or suspending it in one of the abovementioned suspension media, is placed in an appropriate device, for example a mixer, stirred reactor or stirred flask, and perborate or a mixture of perborate and perborate activator is added, optionally with the addition of a base. However, a ready-dried or purified and dried polysaccharide ether can be used to prepare a suspension into which the perborate or the perborate and the perborate activator and, if desired, a base can be incorporated by mixing. The suspension medium (or slurrying medium, if the suspension can be considered a slurry) for the polysaccharide ethers is suitably one of the abovementioned suspension media for solid perborates. For a slurry-like suspension, the weight ratio of suspension medium to polysaccharide ether (dry basis) is from 1:1 to 5:1; otherwise, the suspension medium ratios normally chosen are from 6:1 to 25:1.

The percentage of perborate, based on the dry polysaccharide ether (100%), is usually not more than 20% by weight. The water content of a slurry-like suspension is preferably not more than 30% by weight. The slurry or other suspension of polysaccharide ether and perborate or perborate and perborate activator is mixed at a temperature of between 25° and 90° C., preferably between 50° and 80° C., while depolymerization takes place. The low molecular weight polysaccharide ether which is produced by this process can be obtained from the slurry form of suspension by subsequently removing the slurrying medium, for example by means of distillation, in a more or less dry and salt-containing form. When working in other forms of suspension, the polysaccharide ether which is left after separating off the suspension medium, for example by filtration, and drying is obtained in a more or less salt-containing condition.

As an alternative, depending on the desired degree of freedom from salt, the depolymerized polysaccharide ether can subsequently be washed, for example with an aqueous organic solvent, and then dried.

As already mentioned above, the addition of perborate, alone or in combination with perborate activator can take place by addition in the form of an aqueous solution, a suspension or as solid. The concentration of perborate in the aqueous solution which is employed is an oxidatively effective amount, generally up to 2.5% by weight, based on the perborate. When a suspension is used the weight ratio of suspension medium to perborate or to perborate/perborate activator mixture is from 2:1 to 15:1. The molar quantity of perborate, based on the perborate activator, is generally equal to the molar quantity of the peroxy acid which is formed from one mole of perborate activator. For instance, in the case of TAED two moles of peracetic acid on average are formed from one mole of TAED, and therefore the molar ratio of perborate to TAED is selected to be 2:1.

The depolymerization of polysaccharide ethers takes place in an alkaline medium, i.e. at a pH of the slurry or suspension of greater than 7, preferably from 7 to 14, more rapidly than under neutral conditions. In this context the alkalinity is characterized either by the molar ratio of base to the polysaccharide from which the polysaccharide ether is prepared or alternatively by its ratio to the polysaccharide ether itself. The ratio is generally expressed in mole of base per basic molecular mass of polysaccharide or, respectively, polysaccharide ether. The base is preferably an inorganic hydroxide such as an alkali metal hydroxide, for example sodium hydroxide in the form of caustic soda (from 99 to 100% strength) or as a concentrated aqueous solution with a strength of about 50%. Potassium hydroxide is an example of another alkali metal hydroxide which can also be used, e.g. in the form of a potassium hydroxide solution. The content of base chosen during the depolymerization is preferably from 0.05 to 0.5 mol of base per basic molecular mass of polysaccharide ether. When the polysaccharide ether is depolymerized directly after the polysaccharide etherification process, the abovementioned content of base is generally brought about at the initial stage by choosing an excess of base, based on the etherifying agent employed per polysaccharide. The base can also be added, however, in an extra step after the end of the etherification process, or in the course of a separate operation of slurrying or of preparing a suspension.

A preferred embodiment of the invention finds application in the depolymerization of polysaccharide ethers by treatment with perborates or perborate/perborate activator mixtures in an alkaline medium, characterized by a base content of from 0.05 to 0.5 mol of base per basic molecular mass of polysaccharide ether, at temperatures of between 25° and 90° C., preferably from 50° to 80° C., in cases in which the polysaccharide ether is slurried with from one to five parts by weight of a suspension medium, and the slurrying medium, directly following the depolymerization process and after neutralization of the residual base with a suitable acid, is distilled off, for example by applying a vacuum, and the depolymerized polysaccharide ether is thereby obtained in water-moist or dry form. In this context the term "slurry" as used above may refer either to the reaction slurry which is present following the etherification process or else to a slurry which is prepared separately, for example with a polysaccharide ether which has already been dried or is dry and which has been purified to leave it largely free of salt.

A further embodiment of the invention differs from that given above in that the polysaccharide ether is suspended in a water-miscible organic solvent in a ratio of suspension medium to polysaccharide ether of from 6:1 to 25:1, and the depolymerized polysaccharide ether, following neutralization of the residual base, is filtered off and dried.

After the end of the depolymerization according to the invention and following neutralization of the residual base with a suitable acid, for example acetic or hydrochloric acid or a mixture thereof, remaining salts can if required be removed from the reaction mixture by extraction with water-miscible organic solvents. This extraction takes place without agglomeration or agglutination, since the water loading of the depolymerized polysaccharide ether is low as a result of the treatment in accordance with the invention.

The process according to the invention can be used in principle to depolymerize polysaccharide ethers in a controlled manner, i.e. to virtually any desired extent, with little or no harmful degradation taking place. The relatively high molecular weight polysaccharide ethers are preferably degraded to a useful average molecular mass $M\eta$ which need not exceed about 5000. This corresponds to a viscosity of 2 mPa.s (measured using a Höppler falling-ball viscometer in a 1.9% strength by weight aqueous solution at 20° C.). The resulting polysaccharide ethers show little or no discoloration. Further advantages of the process according to the invention reside in its good reproducibility for obtaining low molecular masses and in the—as desired—minimal quantity of oxygen which is given off during oxidative degradation, so that the formation of an explosive gas mixture during the oxidative degradation does not take place.

The process according to the invention is further illustrated by the following non-limiting Examples.

In these Examples, unless it is otherwise specified, the viscosity is measured on an aqueous solution whose strength by weight, based on dry mass, is 1.9%, measurement being carried out at 20° C. using a Höppler falling-ball viscometer. The average molecular masses are determined, unless indicated otherwise, by the viscosity method using the Ubbelohde viscometer and employing the Staudinger equation.

EXAMPLE 1

1.1 Preparation of the Cellulose Ether (CMC)

8000 g of isopropanol (85%) and 1100 g of 49% strength by weight sodium hydroxide solution are placed in a 20 liter reactor/mixer (plowshare mixer type) and cooled to 13° C., and 1400 g of sodium monochloroacetate (purity 98%) are added. Then 2000 g of air-dry hardwood pulp (residual moisture content 5% by weight, degree of polymerization DP=700) are introduced in finely ground form and the oxygen present is removed by mixing and applying a vacuum. Nitrogen is then fed into the reactor/mixer to an overpressure of 0.1 bar and mixing (alkali treatment) takes place at 25° C. for 30 minutes. Then, in order to etherify the mixture, it is heated to 70° C. over a period of 60 minutes and then maintained at this temperature for a further period of 60 minutes. The reactor/mixer is then vented and a sample is taken to determine the viscosity of the cellulose ether, which is 1000 mPa.s, corresponding to an average molecular mass of 150,000 g/mol.

1.2 Oxidative degradation of the cellulose ether 990 g of a suspension of 165 g of sodium perborate tetrahydrate (corresponding to 6.0% sodium perborate tetrahydrate, based on the carboxymethylcellulose formed) in 825 g of distilled water are added over the course of 2 minutes to the reaction mixture obtained above at a temperature of 70° C., and mixing then continues at 70° C. for 30 minutes. The resulting slurry-type suspension has an overall water content of 21%. A gas sample taken from the vapor space in the mixer 10 minutes after adding the suspension of perborate tetrahydrate has the following composition: 7.5% by vol. oxygen, 30.0% by vol. nitrogen, 42.0% by vol. isopropanol and 20.5% by vol. water. This composition demonstrates that no oxygen is given off during the oxidative degradation from the perborate tetrahydrate employed, since the relative concentrations of oxygen and nitrogen are the same as in air. The vapor composition is outside the region of explosive mixtures.

After a period of 30 minutes the reaction mixture is cooled, the excess of alkali of around 0.1 mol/mole of cellulose is neutralized with acetic acid, and the cellulose ether is washed until free of salt using 60% isopropanol and is dried at 60° C.

The resulting cellulose ether has an average degree of substitution (DS) of 0.88 (determined by the so-called alcohol washing method and incineration using sulfuric acid; see L. Grosse and W. Klaus, Z. Anal. Chem. 259 (1972) 159 to 203). The viscosity is 15 mPa.s, corresponding to a molecular mass of on average 40,000 g/mol.

EXAMPLE 2

2.1 Preparation of the Cellulose Ether (CMC)

87.5 liters of isopropanol (85%) and 17.5 kg of air-dry hardwood pulp (DP about 1300, residual moisture content: 5% by weight) in finely ground form are placed in a reactor/mixer with a useful volume of 240 liters. After the addition of 6.7 liters of 49.5% strength by weight aqueous sodium hydroxide solution, alkali treatment is carried out at a temperature of between 25° and 30° C. for half an hour. Then 13.5 kg of sodium monochloroacetate are added. Atmospheric oxygen is then removed from the reaction slurry by applying a vacuum, nitrogen is fed in up to an overpressure of 0.11 bar, and the mixture is heated to a temperature of 70° C. over the course of 45 minutes for etherification. While the temperature is being raised, the overpressure which forms in the vapor space is relieved by means of a manostat and fed to a waste-gas scrubber, and a pressure of 1.11 bar is set at 70° C. After it has reached 70°

C. the reaction slurry is stirred at a temperature of between 68° and 78° C. for one hour. Following this etherification period the reaction slurry is cooled to 68° C. At the product outlet a sample of the resulting carboxymethylcellulose is taken, while a gas sample is taken from the vapor space. The carboxymethylcellulose prepared has a viscosity of 850 mPa.s, corresponding to an average molecular mass of 149,000 g/mol. The composition of the gas sample is as follows: 5% by vol. oxygen, 73% by vol. nitrogen, 15% by vol. isopropanol and 7% by vol. water.

2.2 Oxidative Degradation of the Cellulose Ether

Directly after sampling, 250 g of sodium perborate tetrahydrate (corresponding to 1% sodium perborate tetrahydrate, based on the carboxymethylcellulose formed) are shaken into the reaction slurry in solid form by means of a ball valve, and after about 4 minutes a further gas sample is taken from the vapor space. During the addition, the reaction slurry is stirred and heated, to reach a final temperature of 80° C. 20 minutes after addition of the first portion a further 250 g of sodium perborate tetrahydrate in solid form are shaken into the mixer, and again, about 4 minutes later, a gas sample is taken. This process is repeated twice more, so that a total of 1000 g of sodium perborate tetrahydrate (corresponding to 4.0% sodium perborate tetrahydrate, based on the CMC formed) are employed and 5 samples are taken from the vapor space atmosphere. The overall water content of the slurry at the end is 17%. After addition of the last portion of sodium perborate tetrahydrate, stirring is continued at 80° C. for 20 minutes before the small excess of alkali is neutralized with acetic acid, and then the depolymerized carboxymethylcellulose is taken out of the mixer and worked up in analogy to Example 1. The carboxymethylcellulose ether prepared has an average degree of substitution (DS) of 0.84, and a viscosity of 19 mPa.s, corresponding to an average molecular mass of 52,000 g/mol. Table 2 shows the composition of the vapor space samples taken during the depolymerization.

EXAMPLES 3 TO 6

Four carboxymethylcellulose ether products are prepared as described in Example 1 and using the same quantities of starting material, in each case in a new batch, and following etherification are depolymerized at 70° C. and—calculated from the end of the addition of perborate tetrahydrate—over the course of 30 minutes, the only difference from Example 1 being that the sodium perborate tetrahydrate is added as a solid powder in suspension in 85% isopropanol over the course of a few minutes, and in quantities which increase from Example 3 to Example 6. The overall water content of the slurry is not more than 17%. Table 3 lists the quantities of perborate tetrahydrate employed, based on air-dry pulp, the compositions of the perborate suspensions, and the characteristics of these depolymerized carboxymethylcellulose ethers as analyzed by the methods quoted.

EXAMPLE 7

1250 g of isopropanol (80%) are placed in a 2 liter three-necked flask fitted with stirrer and reflux condenser, and 125 g of a carboxymethylcellulose having a DS of 0.80, a purity of 94% and a viscosity of 9180 mPa.s, corresponding to a molecular mass of on average 200,000 g/mol, are incorporated by stirring. The suspension is heated to 60° C. using a heating bath, 9 g of 49.5% strength by weight sodium hydroxide solution are added and the mixture is stirred for 10 minutes. Then 15 g of sodium perborate tetrahydrate (corresponding to 12.75% sodium perborate tetrahydrate, based on dry CMC) in solid form are added to the suspension, and stirring is continued at 60° C. for a total of 90 minutes. The overall water content of the slurry is 19.5%. About 7 g of the end product and 7 g each of two samples taken after 30 and 60 minutes, respectively (the weights being calculated on a dry basis), are stirred into 250 ml of isopropanol (80%) and neutralized with acetic acid, the product is filtered off and dried at 60° C. and its viscosity is determined.

EXAMPLE 8

This Example was carried out in a manner analogous to Example 7, but with the difference that the reaction slurry is heated to 80° C.

Table 4 shows the viscosities of the carboxymethylcellulose ethers obtained in Examples 7 and 8 and the average molecular masses in dependence on the temperature of depolymerization and on the degradation time. Surprisingly, the samples and the end products can be filtered off readily despite their very low solution viscosities. After drying the samples can be brought back into the original granular structure of the initial product by brief treatment in a laboratory hammer bar mill.

EXAMPLE 9

A batch is processed at a temperature of 60° C. in analogy to Example 7, using twice the quantity of sodium hydroxide solution so that the overall water content of the slurry is around 20%. Table 5 shows the dependency of depolymerization on the alkali content. It is evident from the working-up of batch B in particular that the process according to the invention enables unhindered drying and subsequent processing of the depolymerized carboxymethylcellulose despite its extremely low solution viscosities. All samples from batch B regain the granular structure of the cellulose ether employed (Tylose C 6000® from Hoechst AG) after brief treatment in a laboratory hammer bar mill.

Examples 10 and 11 show the advantages of the process according to the invention in the drying of low-polymeric cellulose ethers, with no occurrence of agglomeration or agglutination:

EXAMPLE 10

10.1 Preparation of the Cellulose Ether (CMC)

750 g of isopropanol (85%) and 160 g of solid sodium hydroxide (purity 99%) are placed in a plowshare mixer having a useful volume of 4.5 liters, the mixture is equilibrated to 20° C., and 250 g of finely ground hardwood pulp (degree of polymerization 1480, residual moisture content 5% by weight) are mixed in. Alkali treatment is then carried out at a temperature of between 20° and 25° C. for 30 minutes, and subsequently a solution of 225 g of 80% strength by weight monochloroacetic acid in 225 g of isopropanol (85%) is added dropwise with cooling at a rate such that the temperature of the reaction slurry does not exceed 25° C. After the end of monochloroacetic acid addition, the mixer is closed, the air is removed by applying a vacuum, and nitrogen is passed in to an overpressure of 0.3 bar. The mixture is heated to 75° C. over the course of 30 minutes and at this temperature for 60 minutes. A sample of the carboxymethylcellulose ether prepared has a viscosity of 6300 mPa.s, corresponding to an average molecular mass of around 190,000 g/mol.

10.2 Oxidative Degradation of the Cellulose Ether 57 g of sodium perborate tetrahydrate (corresponding to 17% based on the CMC formed) in the form of the crystalline powder are scattered into the resulting reaction mixture at 75° C. over the course of 30 minutes. The overall water content is 17.5%. After 15 minutes of reaction at 75° C. a sample is taken, the mixer is sealed and the liquid present (isopropanol and water) is removed by applying a vacuum. The mixer is subsequently cooled and opened. The product is in the form of a light mass comprising cotton wool-like and particulate fractions. The particles have the form of spheres whose size ranges from that of lentils to that of hazelnuts. A loose crust is formed on the mixer shaft, but the plowshare blades are free from a coating of material and the entire contents of the mixer can be removed without difficulty and ground in a laboratory mill to fine granules. Further characteristics and analytical data are given in Table 6.

Comparison with Example 10

The depolymerization of the carboxymethylcellulose ether is carried out with the same chemicals and quantities as in Example 10, but with the difference that, in accordance with the prior art, an aqueous hydrogen peroxide solution is used for the depolymerization. In this context, after the end of the etherification reaction and the taking of a "pre-degradation" sample, a solution of 36 g of 35% strength hydrogen peroxide in 48 g of distilled water is added dropwise at 75° C. over the course of 30 minutes, producing a water content of 20%. The mixture is stirred at 75° C. for 15 minutes. After the "post-degradation" sample has been taken, the procedure for the first batch is resumed in that the liquid comprising isopropanol and water is removed, the reaction slurry is cooled and the mixer is opened. The entire product is observed to have adhered in the form of honey-colored, vitreous and rubberlike clumps on the mixer shaft and the plowshare blades. For the purposes of analysis, a sample is taken "after steaming out". The cellulose ether prepared cannot be utilized and the batch is discarded. Table 6 shows the product characteristics obtained.

The depolymerizing action of sodium perborate tetrahydrate can be controlled using activators, for example TAED (tetraacetylethylenediamine), so that even at low temperatures low molecular weight cellulose ethers can be prepared within acceptable reaction times (see Example 11):

EXAMPLE 11

In this Example the procedure was as in Example 1, but using a finely ground hardwood pulp with a degree of polymerization DP of 660. For depolymerization, after etherification a freshly prepared suspension of the crystalline powders of sodium perborate tetrahydrate (165 g) and the activator TAED (125 g) in 825 g of distilled water is added to the reaction slurry, giving a water content of 17%. Depolymerization takes place in the reaction mixture (A) at 50° C. over a period of 30 minutes and in a second reaction mixture (B) at 70° C.

Example for Comparison with Example 11

In accordance with the procedure described in Example 11, in reaction mixtures (C) and (D) the depolymerization of the carboxymethylcellulose is carried out using a suspension of TAED in 12.5% strength by weight aqueous hydrogen peroxide solution. In terms of its peroxide and TAED content, the suspension corresponds to that of Example 11. After etherification has been carried out the suspension is added rapidly to the reaction mixture. An overall water content of 18% is obtained. The temperatures employed are 70° C. for reaction mixture (D) and 50° C. for (C).

Table 7 contains the characteristics determined for the reaction mixtures. These show that the combination, according to the invention, of perborate and activator leads to a rapid and effective depolymerization, especially at lower temperatures.

EXAMPLE 12

12.1 Preparation of the Cellulose Ether (CMHEC)

3000 g of isopropanol (85%) and 705 g of 49.5% strength by weight sodium hydroxide solution are placed in a 20 liter reactor/mixer (plowshare mixer type) and are cooled to 16° C. Then 680 g of sodium monochloroacetate and, directly thereafter, 1000 g of air-dry pinewood pulp (residual moisture content 5% by weight, degree of polymerization DP=600) are admixed with cooling and the oxygen present is removed by mixing and applying a vacuum. The alkali treatment of the pulp is carried out at a temperature below 20° C. over 30 minutes. Next, 385 g of ethylene oxide (EO) are added. Etherification is carried out over 60 minutes at 40° C., then over 30 minutes at above 50° C. and finally over 90 minutes at 70° C. After venting the apparatus, the viscosity of the CMHEC prepared is determined from a sample.

12.2 Oxidative Degradation of the Cellulose Ether

After this, at 70° C., 30 g of solid sodium perborate tetrahydrate (corresponding to 1.9% sodium perborate tetrahydrate based on the CMHEC formed) are scattered rapidly into the reaction mixture. After 15 minutes a second product sample is taken for viscosity determination, and then another 30 g of solid sodium perborate tetrahydrate are added. A third product sample is taken after 15 minutes and then a further 30 g of solid sodium perborate tetrahydrate are added (i.e. a total of 5.7%, based on CMHEC, the final overall water content of the slurry being 18%). After 15 minutes a fourth sample is taken so that its viscosity can be determined. For this purpose, the residual alkali in the samples is neutralized with aqueous isopropanol and the samples are then washed until free of salt. The carboxymethylhydroxyethylcellulose prepared has an average degree of substitution DS of 0.84 and a molar degree of substitution MS of 0.91. The viscosities measured can be seen in Table 8.

EXAMPLE 13

In accordance with Example 12 a further carboxymethylhydroxyethylcellulose is prepared. In contrast with Example 12, a total of 60 g of sodium perborate monohydrate are used in 3 portions of 20 g (i.e. a total of 3.8% sodium perborate monohydrate, based on CMHEC, the final water content of the slurry being 18%). The depolymerized carboxymethylhydroxyethylcellulose ether has an average degree of substitution DS of 0.85 and a molar degree of substitution MS of 0.89. Table 9 contains the characteristics for this degradation experiment.

EXAMPLE 14

14.1 Preparation of the Cellulose Ether (HEC)

7670 g of isopropanol (85%), 610 g of 49% strength by weight sodium hydroxide solution and 1000 g of pinewood pulp (residual moisture content: 5% by weight, degree of polymerization DP=810) in finely powdered form are mixed at 25° C. in a 20 liter reactor/mixer (plowshare mixer type) and the oxygen present is removed by mixing and applying a vacuum. Alkali treatment is carried out over a period of 30 minutes. Then 1160 g of ethylene oxide are metered in and the reaction mixture is maintained at a temperature of between 25° and 30° C. for 80 minutes. Subsequently, over the course of 40 minutes, the temperature is raised to 60° C.

and is maintained at from 65° to 70° C. for a further 60 minutes. The mixer is then cooled and vented and a sample (sample 1) of the hydroxyethylcellulose ether prepared is taken and is neutralized immediately with a mixture of hydrochloric and acetic acid (molar ratio 4:1).

14.2 Oxidative Degradation of the Cellulose Ether

A third of the alkaline reaction mixture is transferred to a 4.5 liter plowshare mixer and heated to 70° C. Then 15 g of solid sodium perborate tetrahydrate (corresponding to 2.9% sodium perborate tetrahydrate, based on the HEC employed) in crystalline form are scattered in rapidly and, after 15 minutes, a further 15 g of solid sodium perborate tetrahydrate are added, the temperature being maintained at 70° C. (i.e. a total of 5.8% sodium perborate tetrahydrate were employed, based on HEC). After a total of 30 minutes the mixture is neutralized with the abovementioned acid mixture and is removed. A small portion of the depolymerized hydroxyethylcellulose is extracted using 85% isopropanol and 80 to 90% acetone until the sodium chloride content is below 1%. After the cellulose ether has been dried its viscosity is determined (sample 2).

The second third of the reaction mixture is depolymerized in the 4.5 liter plowshare mixer in the same way but using a solid mixture of sodium perborate tetrahydrate and TAED (sample 3).

The final third is depolymerized using sodium perborate monohydrate but with two portions of only 10 g, corresponding to 2×1.95% sodium perborate monohydrate based on HEC (sample 4). The final overall water content of the degradation slurry is 14.5%.

Table 10 lists the characteristics of the hydroxyethylcellulose prepared (MS=2.30) and of the depolymerized cellulose ethers.

Examples 15 and 16 demonstrate that sodium perborate monohydrate even on its own, and in combination with an activator, has a good depolymerization effect:

EXAMPLE 15

The procedure is as in Example 11. At the end of the etherification phase a sample is taken and is neutralized immediately with acetic acid. Then 110 g of solid sodium perborate monohydrate (corresponding to 4.2% sodium perborate monohydrate, based on the CMC formed) are scattered rapidly into the reaction slurry, which has a temperature of 70° C., and the mixture is stirred at 70° C. for 30 minutes. The water content of this slurry is 16.5%. The depolymerized cellulose ether is neutralized with acetic acid, cooled and extracted until salt-free using aqueous isopropanol, and its viscosity is determined. Table 11 contains the characteristics which were determined.

EXAMPLE 16

16.1 Preparation of the Cellulose Ether (CMC)

72 kg of isopropanol (85%), 9.4 kg of 49.5% strength by weight sodium hydroxide solution and 12 kg of sodium monochloroacetate are mixed at about 15° C. for a short period in a 240 liter reactor/mixer, and then 17.5 kg of finely ground hardwood pulp (residual moisture content: 5%, degree of polymerization DP: 700) are incorporated. The reactor is sealed, the oxygen present is removed while mixing by applying a vacuum, and nitrogen is passed in to an overpressure of 0.1 bar. The alkali treatment of the pulp is carried out over 30 minutes at a temperature of between 25° and 30° C. The mixture is then heated to 70° C. over the course of 60 minutes and is etherified for 60 minutes at this temperature. The reaction mixer is subsequently vented and a sample is taken ("pre-degradation") and is neutralized immediately with acetic acid.

16.2 Oxidative Degradation of the Cellulose Ether

Subsequently, a mixture of 480 g of solid sodium perborate monohydrate (corresponding to 2.0% sodium perborate monohydrate, based on the CMC formed) and 545 g of TAED is scattered into the alkaline reaction slurry which is stirred at a temperature of 70° C. for 60 minutes. The water content of this slurry is 16%. The excess alkali is then neutralized with acetic acid, the reaction slurry is cooled, the depolymerized cellulose ether is removed from the mixer and, after extraction of the salts using aqueous isopropanol and drying, the viscosity of this sample "post-degradation" is determined. The cellulose ether prepared has an average degree of substitution DS of 0.82, and "pre-degradation" a solution viscosity of 650 mPa.s, corresponding to an average molecular mass of 137,000 g/mol. The depolymerized carboxymethylcellulose "post-degradation" has a solution viscosity of 15 mPa.s. This implies an average molecular mass of 45,000 g/mol.

EXAMPLE 17

1275 g of isopropanol (70%) are initially introduced into a 2 liter three-necked flask fitted with stirrer and reflux condenser, and 1.25 g of sodium hydroxide are dissolved therein. The solution is heated to 65° C. and 85 g of salt-free dry sulfoethylcellulose ether (residual moisture content 10.4 degree of etherification DS=0.62; viscosity=10,550 mPa.s; average molecular mass 220,000 g/mol) are suspended therein. The suspension is then stirred for 15 minutes, before 7.70 g of sodium perborate tetrahydrate (corresponding to 10% sodium perborate tetrahydrate, based on SEC) in powder form are added to the suspension. The water content of this suspension is 29%. Subsequently at 65° C., depolymerization is carried out for 60 minutes, the excess alkali is neutralized with acetic acid, and the depolymerized sulfoethylcellulose ether is filtered off and dried at 60° C. without further working-up and purification. The solution viscosity of the product is 4 mPa.s (corresponding to an average molecular mass of 14,000 g/mol).

EXAMPLE 18

250 g of 90% strength aqueous dimethylglycol (DMG, 1,2-dimethoxyethane) are placed in a 500 ml three-necked flask fitted with stirrer and reflux condenser, and 25 g of a carboxymethylcellulose (DS=0.80; purity=94%; viscosity 9180 mPa.s (corresponding to an average molecular mass of 200,000 g/mol)) are incorporated with stirring. The suspension is heated to 60° C. by means of a heating bath, 3.6 g of sodium hydroxide solution (49.5% strength) are added dropwise, the mixture is stirred for 10 minutes and then 3.0 g of sodium perborate tetrahydrate (corresponding to 12.8% sodium perborate tetrahydrate, based on the pure CMC) in suspension in 10 g of 90% strength DMG are flushed into the flask. The suspension has an overall water content of 10%. It is then stirred at 60° C. for 60 minutes. After this time the excess sodium hydroxide solution is neutralized with 50% strength acetic acid, and the degraded CMC is filtered off and dried at 60° C. The product has a viscosity of 14 mPa.s, corresponding to an average molecular mass of 44,000 g/mol.

EXAMPLE 19

The experimental setup is in accordance with Example 18, but 125 g of 93% ethanol are initially introduced. After stirring in 25 g of the CMC of Example 18, heating to 60° C., adding 3.6 g of 49.5% strength sodium hydroxide solution dropwise and homogenizing the mixture for 10 minutes, 3.0 g of sodium perborate tetrahydrate in suspension in 10 g of ethanol (93%) are added to the flask. The water content of the suspension is 7.4%. After the suspension has been stirred at 60° C. for 60 minutes it is neutralized with 50% strength acetic acid and the product is filtered off and dried at 60° C. It has a viscosity of 70 mPa.s, corresponding to an average molecular mass of 82,500 g/mol.

EXAMPLE 20

(Experimental setup as in Example 18.)

250 g of 85% isopropanol are placed in the flask, and 25 g of methylhydroxyethylcellulose (MHEC; moisture content 9 %, DS ($OCH_3$)=1.51; MS ($OC_2H_4$)=0.17; viscosity=68,000 mPa.s, corresponding to an average molecular mass of 227,000 g/mol) are incorporated with stirring. Stirring is continued while the mixture is heated to 60° C., 3.6 g of sodium hydroxide solution (49.5% strength) are added dropwise, the mixture is homogenized for 10 minutes and then a suspension of 1.5 g of sodium perborate tetrahydrate (6.6% based on dry MHEC) in 10 g of distilled water is added and the mixture is stirred at 60° C. for 60 minutes. The overall mixture has a water content of 17.2%. Following this procedure the mixture is neutralized with 50% strength acetic acid, and the solid is filtered off, washed once with 250 g of 100% isopropanol and then dried at 60° C. The degraded MHEC has a viscosity of 125 mPa.s, corresponding to an average molecular mass of 81,000 g/mol.

EXAMPLE 21

(Experimental setup as in Example 18.)

250 g of 90% isopropanol are placed in the flask, and 25 g of methylhydroxyethylcarboxymethylcellulose (MHECMC; moisture content 2%; DS ($OCH_3$)=1.63; MS ($OC_2H_4$)=0.12; DS (carboxymethyl)=0.05; viscosity over 150,000 mPa.s, corresponding to an average molecular mass of around 250,000 g/mol) are incorporated with stirring. Stirring is continued while the mixture is heated to 60° C., 3.6 g of sodium hydroxide solution (49.5% strength) are added dropwise, the mixture is homogenized for 10 minutes and then 1.5 g of sodium perborate tetrahydrate (6.1% sodium perborate tetrahydrate, based on dry MHECMC) in suspension in 10 g of distilled water are added and the mixture is stirred at 60° C. for 60 minutes. The overall water content of this suspension is 12.5%. Following this the mixture is neutralized with 50% strength acetic acid, and the degraded cellulose ether is filtered off, washed once with 250 g of 100% isopropanol and then dried at 60° C. The depolymerized cellulose ether has a viscosity of 400 mPa.s, corresponding to an average molecular mass of 100,000 g/mol.

EXAMPLE 22

(Experimental setup as in Example 18.)

175 g of isopropanol (85%) are initially introduced into the stirred flask and 25 g of hydroxypropylstarch (HPS; moisture content 7.2%; hydroxypropyl MS=0.32; viscosity= 14 mPa.s, corresponding to an average molecular mass of 35,000 g/mol) are incorporated with stirring. Stirring is continued while heating to 60° C., 3.6 g of sodium hydroxide solution (49.5% strength) are added dropwise, the mixture is homogenized for 10 minutes, 3.0 g of sodium perborate tetrahydrate (12.9% sodium perborate tetrahydrate, based on dry HPS) in suspension in 10 g of 85% isopropanol are added, and the mixture is stirred at 60° C. for 60 minutes. The overall water content of this suspension is 15%. Following this treatment the suspension is neutralized with 50% strength acetic acid, and the degraded HPS is filtered off, washed once with 100% isopropanol and dried at 60° C. The degraded HPS has a viscosity of 4 mPa.s, corresponding to an average molecular mass of 10,000 g/mol.

EXAMPLE 23

In the stirred flask of the same experimental setup as in Example 18, 175 g of 90% acetone are initially introduced and 25 g of a carboxymethylhydroxypropylguar gum (CMHP-guar gum; moisture content 9.0%; carboxymethyl DS=0.13; hydroxypropyl MS=0.40; viscosity over 150,000 mPa.s, corresponding to an average molecular mass of around 250,000 g/mol) are incorporated with stirring. Stirring is continued while the mixture is heated to 55° C., then 3.6 g of sodium hydroxide solution (49.5% strength) are added dropwise, the mixture is homogenized for 10 minutes, 3.0 g of sodium perborate tetrahydrate (13.3% sodium perborate tetrahydrate based on dry CMHP-guar gum) in suspension in 10 g of 90% acetone are added, and the mixture is stirred at 55° C. for 60 minutes. The overall water content of this suspension is 9.8%. Following this procedure, the mixture is neutralized with 50% strength acetic acid, and the degraded CMHP-guar gum is filtered off, washed once with 250 g of 90% acetone and dried at 60° C. The degraded CMHP-guar gum has a viscosity of 19 mPa.s, corresponding to an average molecular mass of 44,000 g/mol.

TABLE 1

Prior art. Composition of the vapor space atmosphere for the $H_2O_2$ degradation of carboxymethylcellulose (CMC)

| Ser. no. | Degree of etherification DS | $H_2O_2$ used per CMC % | Degradation temperature °C. | Viscosity beforehand mPa·s | Viscosity after $H_2O_2$ degradation mPa·s | Pressure in the vapor space, absolute bar | Composition of the vapor space atmosphere[1] $O_2$ % by vol. | $N_2$ % by vol. | IPA/$H_2O$ % by vol. | Explosive: yes/no |
|---|---|---|---|---|---|---|---|---|---|---|
| 1 | 0.77 | 1.43 | 70 | 560 | 24 | 2 | 33 | 31 | 36 | yes |
| 2 | 0.80 | 1.42 | 70 | 560 | 30 | about 2 | 36 | 22 | 42 | yes |
| 3 | 0.72 | 4.35 | 70 | 460 | 7 | 1 | 86 | 6 | 8 | yes |
| 4 | 0.73 | 1.45 | 70 | 645 | 15 | 1.1 | 29 | 60 | 11 | yes |
| 5 | 0.50 | 4.76 | 75 | 300 | 18 | 1 | 45 | 31 | 24 | yes |

TABLE 1-continued

Prior art. Composition of the vapor space atmosphere for the $H_2O_2$ degradation of carboxymethylcellulose (CMC)

| Ser. no. | Degree of etherification DS | $H_2O_2$ used per CMC % | Degradation temperature °C. | Viscosity beforehand mPa·s | Viscosity after $H_2O_2$ degradation | Pressure in the vapor space, absolute bar | Composition of the vapor space atmosphere[1] $O_2$ % by vol. | $N_2$ % by vol. | IPA/ $H_2O$ % by vol. | Explosive: yes/no |
|---|---|---|---|---|---|---|---|---|---|---|
| 6 | 0.87 | 1.60 | 55 | 645 | 18 | 1.1 | 42 | 44 | 14 | yes |
| 7 | 0.82 | 1.60 | 60 | 300 | 33 | 0.9 | 50 | 5 | 45 | yes |

[1] cf. P. Voigtsberger and D. Conrad, Report No. 1980/68; 4-333 "Zündversuche mit Isopropanol/Sauerstoff/Stickstoff-Gemischen" [Ignition experiments with isopropanol/oxygen/nitrogen mixtures], Bundesanstalt für Materialprüfung (BAM) [Federal Institute for Materials Testing], Berlin, 1968.
(IPA = isopropanol)

TABLE 2

Temperature and pressure change and composition of the vapor space atmosphere for the oxidative degradation using solid $NaBO_2.H_2O_2.3H_2O$:

| Gas sample No. | Slurry Temp. °C. | Pressure in the vapor space mbar | Composition of the vapor space atmosphere | | | | explosive?[1] |
|---|---|---|---|---|---|---|---|
| | | | $O_2$ | $N_2$ | IPA | $H_2O$ | |
| | | | % by vol. | | | | |
| 1 | 68 | 1000 | 5 | 73 | 15 | 7 | no |
| 2 | 72 | 1000 | 11 | 51 | 29 | 9 | no |
| 3 | 70 | 975 | 9 | 36 | 45 | 10 | no |
| 4 | 75 | 1000 | 5 | 8 | 68 | 19 | no |
| 5 | 80 | 1000 | — | — | 74 | 26 | no |

[1] See Footnote 1 to Table 1

TABLE 3

Dependency of depolymerization effect on use of perborate tetrahydrate. Addition of the perborate as a crystal suspension in 85% isopropanol.

| Ex | Suspension isopropanol (85%) based on $NaBO_2.H_2O_2.3H_2O$ (crystalline) parts by weight | $NaBO_2.H_2O_2.3H_2O$ based on Pulp (air-dry) % | $NaBO_2.H_2O_2.3H_2O$ based on CMC % | Degree of etherification DS | average molecular mass g/mol | viscosity mPa·s |
|---|---|---|---|---|---|---|
| 3 | 3 | 4.20 | 3.1 | 0.76 | 63,000 | 35 |
| 4 | 3 | 8.42 | 6.2 | 0.81 | 46,000 | 17 |
| 5 | 2.5 | 13.50 | 9.9 | 0.76 | 41,000 | 13 |
| 6 | 2 | 20.15 | 14.8 | 0.81 | 36,000 | 10 |

TABLE 4

Depolymerization of a purified CMC[1] with $NaBO_2.H_2O_2.3H_2O$ (employed in crystalline form) as a function of temperature and time

| Ex. | Temperature during the depolymerization °C. | Duration of depolymerization Minutes | Viscosity mPa·s | average molecular mass of the depolymerized carboxymethylcellulose g/mol |
|---|---|---|---|---|
| 7 | 60 | 30 | 25 | 54,000 |
| | | 60 | 15 | 45,000 |
| | | 90 | 11 | 37,000 |
| 8 | 80 | 30 | 8 | 31,000 |
| | | 60 | 7 | 27,000 |
| | | 90 | 6 | 25,000 |

[1] Tylose C 6000 ® from Hoechst AG, average molecular mass around 200,000 g/mol; viscosity 9180 mPa·s

TABLE 5

Dependency of depolymerization (by $NaBO_2.H_2O_2.3H_2O$) on the alkali content present

| Batch | Mole NaOH per basic mol[1] of the carboxymethylcellulose | quantity of concentrated 49.5% strength sodium hydroxide solution used grams | Duration of depolymerization minutes | Viscosity mPa·s | average molecular mass of the depolymerized carboxymethylcellulose g/mol |
|---|---|---|---|---|---|
| A | 0.21 | 9 | 30 | 25 | 54,000 |
| | | | 60 | 15 | 45,000 |
| | | | 90 | 11 | 37,000 |
| B | 0.42 | 18 | 30 | 14 | 44,000 |
| | | | 60 | 6 | 25,000 |
| | | | 90 | 4 | 13,000 |

[1] The basic molecular mass corresponds to the average molecular mass of the carboxymethylcellulose monomer unit.

TABLE 6

Advantageous effect of the invention on the drying of low-viscosity cellulose ethers following depolymerization, demonstrated using CMC

| | Peroxide, calculated as $H_2O_2$ (based on air-dry pulp) % | DS | salt-free viscosity mPa · s | average molecular mass g/mol | Product characteristics after steaming-out, salt-containing, air-dry | | | | |
|---|---|---|---|---|---|---|---|---|---|
| | | | | | Na glycolate | NaCl % | Moisture content | Viscosity (5% strength aqueous solution) mPa · s | Evaluation of the product "after steaming-out" |
| Quantity of $NaBO_2.H_2O_2.3H_2O$ (according to the invention) | 5.0 | 0.83 | pre-degrad.: 6300 post-degrad.: 4 | 190,000 13,000 | 10.9 | 18.4 | 3.8 | 8 | very good |
| Quantity of 15% strength hydrogen peroxide used (comparison) | 5.0 | 0.81 | pre-degrad.: 520 post-degrad.: 5 | 129,000 18,000 | 13.0 | 21.2 | 5.2 | 25 | unusable |

TABLE 7

Use of $NaBO_2.H_2O_2.3H_2O$ in combination with TAED for depolymerization

| Designation of experiment | Temperature on degradation °C. | $NaBO_2.H_2O_2.3H_2O$ | TAED | Hydrogen peroxide, 12.5% strength solution | DS | Final viscosity, salt-free mPa · s | Average molecular mass g/mol |
|---|---|---|---|---|---|---|---|
| | | g/2000 g of air-dry pulp | | | | | |
| *According to the invention* | | | | | | | |
| A | 50 | 165[1] | 125[1] | — | 0.76 | 20 | 51,000 |
| B | 70 | 165[1] | 125[1] | — | 0.78 | 7 | 27,000 |
| *Comparison with hydrogen peroxide:* | | | | | | | |
| C | 50 | — | 125 | 300 | 0.78 | 340 | 120,000 |
| D | 70 | — | 125 | 300 | 0.76 | 90 | 85,000 |

[1] Suspended in 825 g distilled water

TABLE 8

Depolymerization of CMHEC using $NaBO_2.H_2O_2.3H_2O$ at 70° C. as a function of time and the portionwise addition of the perborate

| Sample | Duration of degradation min | $NaBO_2.H_2O_2.3H_2O$ portion g | Total $NaBO_2.H_2O_2.3H_2O$ g | % based on CMHEC | Viscosity mPa · s | Note | Average molecular mass g/mol |
|---|---|---|---|---|---|---|---|
| 1 | 0 | — | — | | 105 | "pre-degrad." | 100,000 |
| 2 | 15 | 30 | 30 | 1.9 | 13 | "post-degrad." | 50,000 |
| 3 | 30 | 30 | 60 | 3.8 | 7 | "post-degrad." | 32,000 |
| 4 | 45 | 30 | 90 | 5.7 | 4 | "post-degrad." | 16,000 |

TABLE 9

Depolymerization of CMHEC using sodium perborate monohydrate at 70° C. as a function of time and the portionwise addition of the perborate

| Sample | Duration of degradation min | $NaBO_2 \cdot H_2O_2$ portion g | Total $NaBO_2 \cdot H_2O_2$ g | % based on CMHEC | Viscosity mPa · s | Note | Average molecular mass g/mol |
|---|---|---|---|---|---|---|---|
| A | 0 | — | — | | 140 | "pre-degrad." | 117,000 |
| B | 15 | 20 | 20 | 1.27 | 11 | "post-degrad." | 44,000 |
| C | 30 | 20 | 40 | 2.53 | 6 | "post-degrad." | 27,000 |
| D | 45 | 20 | 60 | 3.80 | 3 | "post-degrad." | 8,000 |

TABLE 10

Depolymerization of HEC using $NaBO_2 \cdot H_2O_2 \cdot 3H_2O$, $NaBO_2 \cdot H_2O_2 \cdot 3H_2O$ + TAED and $NaBO_2 \cdot H_2O_2$. Use of peroxide groups (calculated as $H_2O_2$) in each case 2%, based on air-dry pulp. 333 g of pinewood pulp are used for each degradation experiment. Degradation temperature: 70° C., degradation time: 30 minutes.

| Sample | Type of perborate | Overall quantity g | % based on HEC | Added Addition | quantity g | Viscosity mPa · s | average molecular mass g/mol | Comments |
|---|---|---|---|---|---|---|---|---|
| 1 | — | — | — | — | — | 400 | 144,000 | "pre-degrad." |
| 2 | $NaBO_2 \cdot H_2O_2 \cdot 3H_2O$ | 30 | 5.8 | — | — | 3.1 | 7,100 | "post-degrad." |
| 3 | $NaBO_2 \cdot H_2O_2 \cdot 3H_2O$ | 30 | 5.8 | TAED | 22 | 2.7 | 6,500 | "post-degrad." |
| 4 | $NaBO_2 \cdot H_2O_2$ | 20 | 3.9 | — | — | 4.4 | 19,700 | "post-degrad." |

TABLE 11

Depolymerization of CMC using $NaBO_2 \cdot H_2O_2$ at 70° C. Duration of degradation: 30 minutes. The degree of etherification (DS) of the CMC is 0.76.

| Sample | $NaBO_2 \cdot H_2O_2$ addition g | % based on CMC | Viscosity mPa · s | Average molecular mass g/mol | Comments |
|---|---|---|---|---|---|
| A | — | — | 720 | 138,000 | "pre-degrad." |
| B | 110 | 4.2 | 10 | 35,000 | "post-degrad." |

What is claimed is:

1. A process for lowering the molecular weight of a cellulose ether or starch ether by oxidative degradation, comprising: adding to a cellulose ether or starch ether starting material a perborate and carrying out the oxidative degradation at a temperature in the range of about 25° to about 90° C. to obtain the oxidatively degraded product.

2. The process as claimed in claim 1, wherein the cellulose ether or starch ether starting material is in suspension in a suspension medium and has an average molecular mass M of from 10,000 to 350,000 g/mol, and wherein the resulting oxidatively degraded cellulose ether or starch ether is recovered from the suspension medium.

3. The process as claimed in claim 1, wherein the ether starting material comprises a cellulose ether, and the cellulose ether is a carboxyalkylcellulose ether, hydroxyalkylcellulose ether, alkylcellulose ether, alkylhydroxyalkylcellulose ether, alkylhydroxyalkylcarboxyalkylcellulose ether, sulfoalkylcellulose ether, carboxyalkylsulfoalkylcellulose ether, alkylhydroxyalkylsulfoalkylcellulose ether, alkyloxyhydroxyalkylhydroxyalkylcellulose ether or hydroxyalkylsulfoalkylcellulose ether.

4. The process as claimed in claim 3, wherein the cellulose ether contains a $C_1$–$C_4$-alkyl group.

5. The process as claimed in claim 1, wherein the cellulose ether or starch ether starting material comprises a starch ether, and the starch ether is a carboxyalkylstarch ether, hydroxyalkylstarch ether or a mixed ether thereof.

6. The process as claimed in claim 1, wherein a said perborate is an alkali metal perborate, an alkaline earth metal perborate or a mixture thereof.

7. The process as claimed in claim 6, wherein the alkali metal perborate is sodium perborate tetrahydrate, sodium perborate monohydrate, or a mixture thereof.

8. The process as claimed in claim 1, wherein the oxidative degradation comprises adding an oxidatively-active ingredient which consists essentially of a said perborate alone or in combination with a perborate activator.

9. The process as claimed in claim 8, wherein said oxidatively-active ingredient is added in the form of a solution, a crystal suspension or as a solid.

10. The process as claimed in claim 8, wherein said oxidatively-active ingredient is added in the form of a solution, and the solvent for said solution comprises water.

11. The process as claimed in claim 8, wherein the suspension medium employed for the crystal suspension is water, a water-miscible organic solvent or an aqueous mixture thereof.

12. The process as claimed in claim 11, wherein the water-miscible organic solvent employed is a $C_1$–$C_6$ alcohol, an ether or a ketone.

13. The process as claimed in claim 8, wherein said oxidatively-active ingredient is added in the form of an aqueous solution, and wherein said solution contains an amount of perborate ranging from an oxidatively effective amount up to 2.5% by weight, based on the weight of solution.

14. The process as claimed in claim 9, wherein said oxidatively-active ingredient is added in the form of a crystal suspension in a suspension medium, and the ratio of perborate or perborate/perborate activator combination to suspension medium is from 1:2 to 1:15.

15. The process as claimed in claim 1, wherein the oxidative degradation is carried out in the presence of a perborate activator, and wherein said perborate activator contains an acyl group.

16. The process as claimed in claim 15, wherein the molar quantity of perborate, based on the perborate activator, is equal to the molar quantity of peroxy acid which is formed from one mole of perborate activator.

17. The process as claimed in claim 1, wherein the quantity of perborate is from 0.1 to 20% by weight, based on the dry weight of the cellulose ether or starch ether starting material.

18. The process as claimed in claim 1, wherein the oxidative degradation is carried out at an alkaline pH above 7.

19. The process as claimed in claim 1, wherein the cellulose ether or starch ether starting material is suspended in a suspension medium for the oxidative degradation, and the suspension medium is a $C_1$–$C_6$ alcohol, an ether, a ketone or an aqueous mixture thereof.

20. The process as claimed in claim 19, wherein the suspension comprising the cellulose ether or starch ether starting material is a slurry, said suspension medium being a slurrying medium, and wherein the weight ratio of slurrying medium to cellulose ether or starch ether starting material is from 1:1 to 5:1.

21. The process as claimed in claim 19, wherein the weight ratio of suspension medium to cellulose ether or starch ether starting material is from 6:1 to 25:1.

22. The process as claimed in claim 1, wherein, if water is present in the reaction mixture during the oxidative degradation, the water content of the reaction mixture during the oxidative degradation does not exceed 30% by weight.

23. The process as claimed in claim 1, wherein the oxidative degradation is carried out in a slurrying medium, and wherein the slurrying medium is removed by distillation after the end of the oxidative degradation.

24. The process as claimed in claim 1, wherein the cellulose ether or starch ether starting material has an average molecular mass greater than 10,000 g/mol and is relatively high in molecular weight by comparison to the product of said oxidative degradation, said relatively high molecular weight cellulose ether or starch ether having been obtained from a cellulose either or starch by alkali treatment and etherification in an etherification reaction mixture, and wherein the resulting relatively high molecular weight cellulose either or starch ether obtained from said alkali treatment and etherification is subjected to said oxidative degradation without isolation of the relatively high molecular weight cellulose either or starch ether from said etherification reaction mixture.

* * * * *